United States Patent [19]
Shifman et al.

[11] Patent Number: 5,626,369
[45] Date of Patent: May 6, 1997

[54] HOSE ASSEMBLY, INTERNALLY THREADED MEMBER THEREFOR AND METHODS OF MAKING THE SAME

[75] Inventors: Jerry Shifman, Prospect; Leonard D. Horst, Bucyrus, both of Ohio; Jon H. Snyder, Arden, N.C.; Richard C. Kucyr, Gallion, Ohio; Harold D. Beck, Strafford, Mo.

[73] Assignee: Dayco Products, Inc., Dayton, Ohio

[21] Appl. No.: 438,868

[22] Filed: May 10, 1995

[51] Int. Cl.⁶ .................................................. F16L 35/00
[52] U.S. Cl. .................. 285/38; 285/246; 285/330; 285/423; 29/450; 264/229; 264/241; 264/292
[58] Field of Search ............................ 285/38, 423, 246, 285/330; 29/450; 264/229, 35, 241, 292

[56] References Cited

U.S. PATENT DOCUMENTS

| 3,121,355 | 2/1964 | Morel et al. | 285/38 X |
|---|---|---|---|
| 3,413,017 | 11/1968 | Hughey | 285/38 |
| 4,058,031 | 11/1977 | Magarian | 81/64 |
| 4,805,933 | 2/1989 | Swisher | 285/38 |
| 4,893,848 | 1/1990 | Melcher | 285/423 X |
| 5,390,572 | 2/1995 | Gakhar et al. | 81/436 |

FOREIGN PATENT DOCUMENTS 2233724  1/1991  United Kingdom ................ 285/38

*Primary Examiner*—Dave W. Arola
*Attorney, Agent, or Firm*—Joseph V. Tassone

[57] ABSTRACT

A hose assembly, an internally threaded member therefor and methods of making the same are provided, the hose assembly comprising a flexible hose having opposite ends, an internally threaded member mounted on one of the opposite ends in a manner to swivel thereon to permit the internally threaded member to be finger coupled to an externally threaded part of a liquid dispensing spigot, the internally threaded member having an outer peripheral surface, and an annular member disposed around the internally threaded member in a manner to engage the outer peripheral surface thereof and having an external peripheral surface to be finger engaged for turning the internally threaded member in unison therewith relative to the hose, the annular member comprising a SANTOPRENE material.

21 Claims, 3 Drawing Sheets

HOSE ASSEMBLY, INTERNALLY THREADED MEMBER THEREFOR AND METHODS OF MAKING THE SAME

BACKGROUND OF THE INVENTION

1. Field of the Invention

This invention relates to a new hose assembly and new internally threaded member therefor as well as to a new method of making such a hose assembly and to a new method of making a such an internally threaded member.

2. Prior Art Statement

It is known to provide a hose assembly comprising a flexible hose having opposite ends, an internally threaded member mounted on one of the opposite ends in a manner to swivel thereon to permit the internally threaded member to be finger coupled to an externally threaded part of a liquid dispensing spigot, the internally threaded member having an outer peripheral surface, and an annular member disposed around the internally threaded member in a manner to engage the outer peripheral surface thereof and having an external peripheral surface to be finger engaged for turning the internally threaded member in unison therewith relative to the hose. For example, see the U.S. patent to Magarian, U.S. Pat. No. 4,058,031 and the U.S. patent to Swisher, U.S. Pat. No. 4,805,933.

SUMMARY OF THE INVENTION

It is one of the features of this invention to provide a new hose assembly wherein the internally threaded member that is swivelly mounted on one of the opposite ends of a flexible hose has a unique annular member disposed there around in a manner to engage the outer peripheral surface thereof and having an external peripheral surface to be finger engaged for turning the internally threaded member in unison therewith relative to the hose.

In particular, it is believed according to the teachings of this invention that the material of the annular member should comprise a SANTOPRENE material as the same is a soft surface material that is non-slippery when wet or dry.

For example, one embodiment of this invention provides a hose assembly comprising a flexible hose having opposite ends, an internally threaded member mounted on one of the opposite ends in a manner to swivel thereon to permit the internally threaded member to be finger coupled to an externally threaded part of a liquid dispensing spigot, the internally threaded member having an outer peripheral surface, and an annular member disposed around the internally threaded member in a manner to engage the outer peripheral surface thereof and having an external peripheral surface to be finger engaged for turning the internally threaded member in unison therewith relative to the hose, the annular member comprising a SANTOPRENE material.

It is another feature of this invention to mold an annular plastic member around the internally threaded member so as to be secured thereto.

For example, another embodiment of this invention comprises a hose assembly comprising a flexible hose having opposite ends, an internally threaded member mounted on one of the opposite ends in a manner to swivel thereon to permit the internally threaded member to be finger coupled to an externally threaded part of a liquid dispensing spigot, the internally threaded member having an outer peripheral surface, and an annular plastic member disposed around the internally threaded member in a manner to engage the outer peripheral surface thereof and having an external peripheral surface to be finger engaged for turning the internally threaded member in unison therewith relative to the hose, the annular plastic member having been molded onto the internally threaded member.

Accordingly, it is an object of this invention to provide a new hose assembly having one or more of the novel features of this invention as set forth above or hereinafter shown or described.

Another object of this invention is to provide a new method of making such a hose assembly, the method of this invention having one or more of the novel features of this invention as set forth above or hereinafter shown or described.

Another object of this invention is to provide a new internally threaded member for such a hose assembly, the internally threaded member of this invention having one or more of the novel features of this invention as set forth above or hereinafter shown or described.

Another object of this invention is to provide a new method of making such an internally threaded member, the method of this invention having one or more of the novel features of this invention as set forth above or hereinafter shown or described.

Other objects, uses and advantages of this invention are apparent from a reading of this description which proceeds with reference to the accompany drawings forming a part thereof and wherein:

DESCRIPTION OF THE PREFERRED EMBODIMENTS

Figure 1:
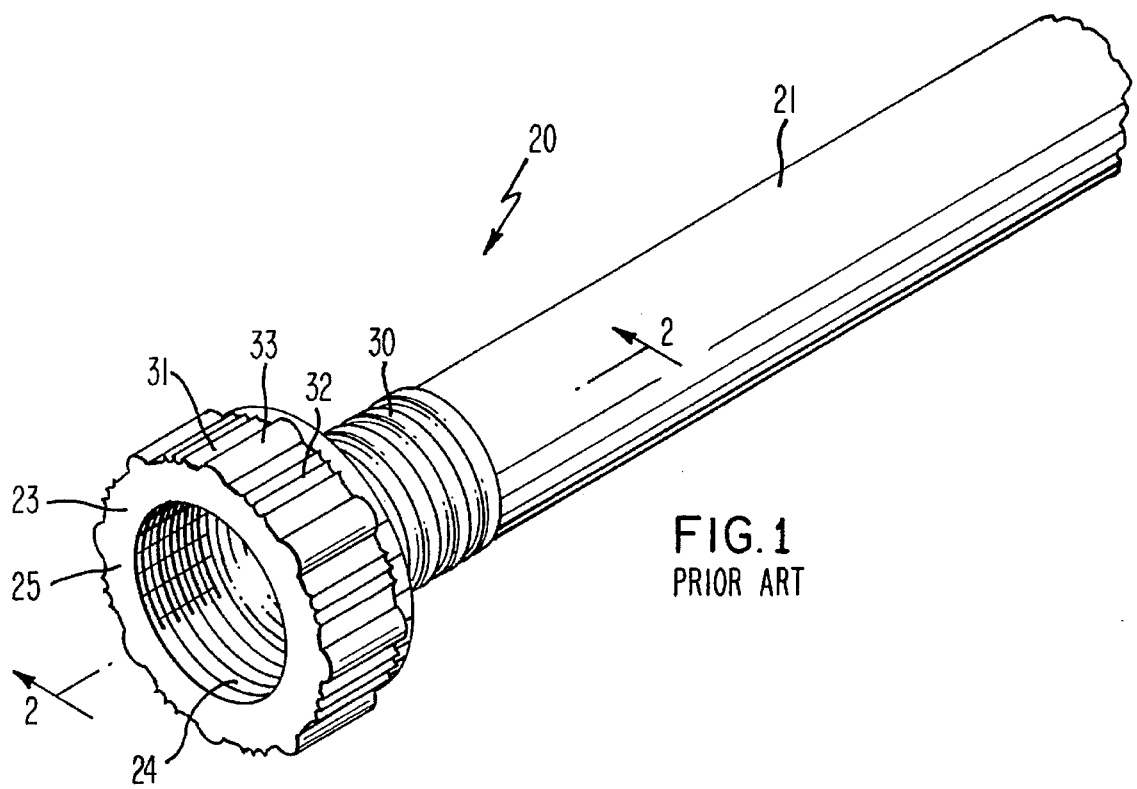
FIG. 1 is a fragmentary perspective view of a prior known hose assembly having an internally threaded member swivelly mounted on one end of the flexible hose thereof.

While the various features of this invention are hereinafter illustrated and described as providing a hose assembly wherein the internally threaded member initially has an external peripheral surface of a particular configuration, it is to be understood that the various features of this invention can be utilized singly or in various combinations thereof to provide a new hose assembly that can be utilized with internally threaded members other than the particular internally threaded member illustrated in the drawings.

Therefore, this invention is not to be limited to only the embodiments illustrated in the drawings, because the drawings are merely utilized to illustrate one of the wide variety of uses of this invention.

Figure 2:
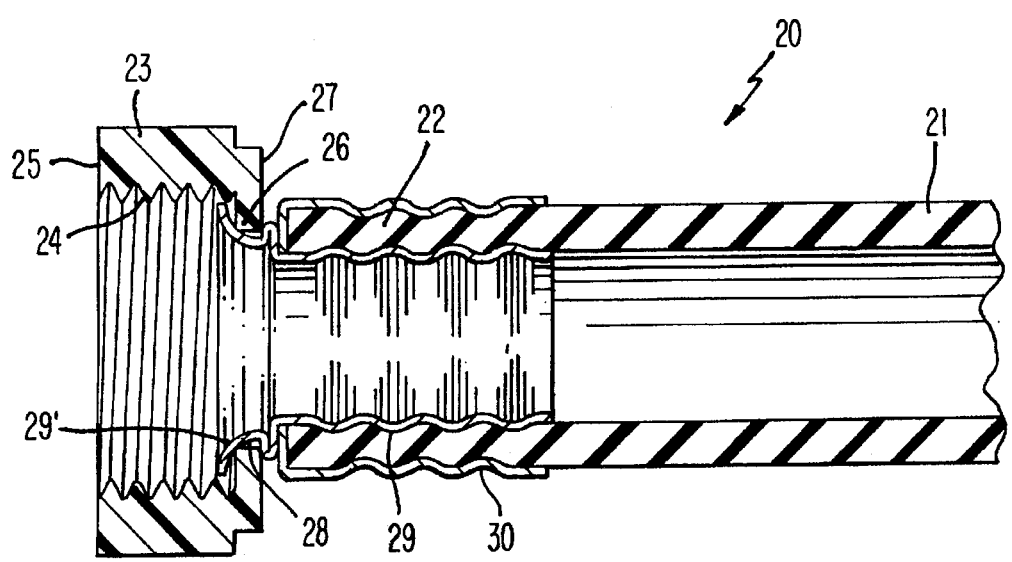
FIG. 2 is an enlarged fragmentary cross-sectional view taken on line 2—2 of FIG. 1.

Referring now to FIGS. 1 and 2, a typical prior known hose assembly is generally indicated by the reference numeral 20 and comprises a flexible hose 21 having opposite ends. Only the opposite end 22 is illustrated in FIGS. 1 and 2 with the understanding that the other opposite end of the flexible hose 21 is coupled to an externally threaded member for coupling to an internally threaded member that is swivelly mounted on an end of another hose in order to provide an extension therewith in a manner well known in the art.

An internally threaded member 23 formed of any suitable material, such as metallic material, plastic material, etc., has an internally threaded opening 24 interrupting an end 25 of the internally threaded member 23 and terminating adjacent an inwardly directed annular flange 26 that forms part of the other side 27 of the internally threaded member 24 and is received in an annular groove 28 of a flared end 29' of an internal metallic coupling member 29 that is adapted to be inserted into the end 22 of the flexible hose 21 and be crimped thereto together with an external metallic ferrule member 30 all in a manner well known in the art.

In this manner, the internally threaded member 23 swivels on the end 22 of the flexible hose 21 and readily permits the same to be finger coupled to an externally threaded part of a liquid dispensing spigot or the like by the user engaging his fingers against the external peripheral surface 31 of the internally threaded member 23 and rotating the internally threaded member 23 in the proper direction to couple onto an externally threaded part of a dispensing spigot that is received in the internally threaded opening 24 of the internally threaded member 23 in a manner well known in the art.

Usually the external peripheral surface 31 of the internally threaded member 23 is provided with a plurality of serrations 32 and/or projections 33 to facilitate the finger coupling or uncoupling operation as the case may be.

Nevertheless, it has been found that the finger coupling operation should be enhanced by providing an annular member over the external peripheral surface 31 of the internally threaded member 23 so that the external peripheral surface of that annular member will be more finger friendly in the coupling and uncoupling operation of the hose assembly.

For example, see the aforementioned U.S. patent to Magarian, U.S. Pat. No. 4,058,031 and the aforementioned U.S. patent to Swisher, U.S. Pat. No. 4,805,933 whereby these two U.S. patents are being incorporated into this disclosure by this reference thereto.

It is believed according to the teachings of this invention that the annular member being disposed on the external peripheral surface of the internally threaded member can be further enhanced if the same is formed of a SANTOPRENE material as such material is a soft surface material that is non-slippery when wet or dry.

It is further believed according to the teachings of this invention that such annular member of SANTOPRENE material can be either snap-fitted onto the internally threaded member to be carried thereby or can be molded directly thereon so that the annular member will rotate in unison with the internally threaded member when a person is finger coupling or uncoupling the hose assembly to or from an externally threaded part of a liquid dispensing spigot or the like.

"SANTOPRENE" is a registered trademark of the Monsanto Corporation of St. Louis, Mo. and it is well known that there are numerous SANTOPRENE materials sold by the Monsanto Rubber Chemicals Division, Monsanto Industrial Chemicals Co., 260 Springside Drive, Akron, Ohio., SANTOPRENE being a thermoplastic elastomer which exhibits rubber-like properties.

Thus, it is believed according to the teachings of this invention that at least one of such SANTOPRENE materials will uniquely function to form the annular member of this invention for the internally threaded member of the hose assembly of this invention.

Figure 3:
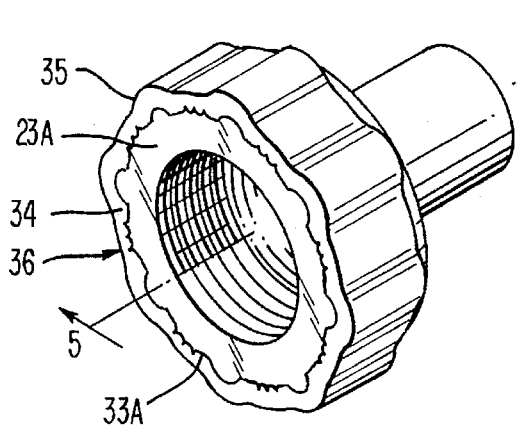
FIG. 3 is a perspective view of the new internally threaded member of the new hose assembly of this invention.
Figure 5:
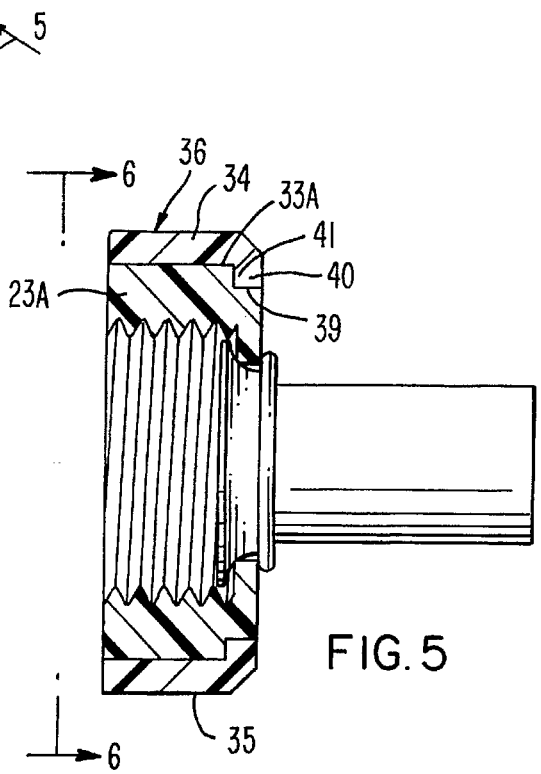
FIG. 5 is a view similar to FIG. 4 and illustrates the outer annular member disposed in its final position on the internally threaded member.
Figure 6:
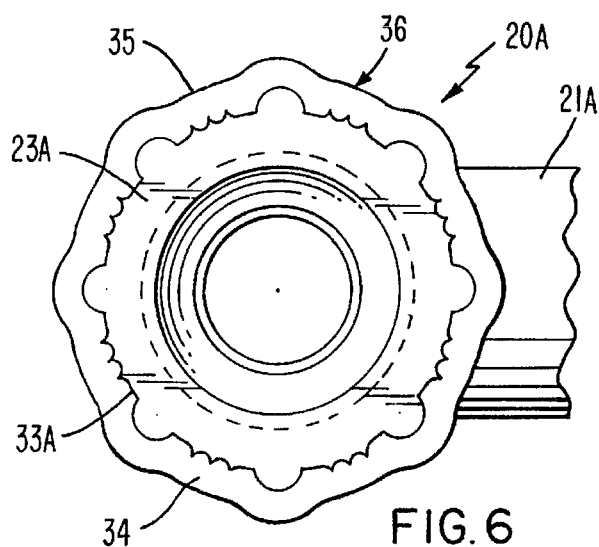
FIG. 6 is a front view of the internally threaded member illustrated in FIG. 5 and schematically illustrates the same mounted to an end of a flexible hose to form the new hose assembly of this invention in a manner similar to the prior known hose assembly of FIG. 2, FIG. 6. being taken in the direction of the arrows 6—6 of FIG. 5.

Referring now to FIGS. 3, 5 and 6, the new hose assembly of this invention is generally indicated by the reference numeral 20A in FIG. 6 and parts thereof similar to the parts of the hose assembly 20 previously described are indicated by like reference numerals followed by the reference letter A.

The hose assembly 20A of this invention has the flexible hose 21A provided with an internally threaded member 23A swively mounted on an end thereof in the same manner as the internally threaded member 23 of the hose assembly 20. However, an annular member 34 of SANTOPRENE material is disposed over and against the external peripheral surface 33A of the internal threaded member 23A and has an external peripheral surface 35 that somewhat conforms to the external peripheral surface 33A of the internally threaded member 23A and is adapted to be finger engaged for swiveling the internally threaded member 23A in unison therewith for coupling or uncoupling the hose assembly 20A to an externally threaded part of a dispensing spigot or the like.

As previously stated, the external peripheral surface 35 of the annular member 34 when formed of SANTOPRENE material is a soft surface and is non-slippery when dry or wet so as to enhance the finger coupling and uncoupling operation for the reasons previously set forth.

Since the internally threaded member 23A now has the annular member 34 disposed thereon, the parts 23A and 34 now define a new internally threaded assembly that is generally indicated by the reference numeral 36 in FIGS. 3, 5 and 6.

Figure 4:
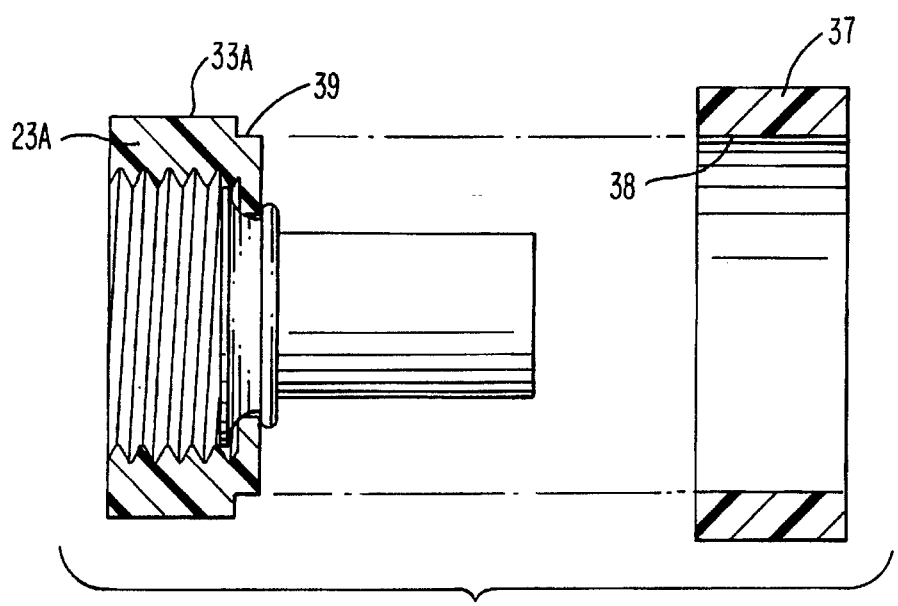
FIG. 4 is an exploded cross-sectional view illustrating one method of disposing the annular member over the internally threaded member to form the internally threaded assembly of this invention that is illustrated in FIG. 3.

It is believed that the member 34 of the internally threaded assembly 36 of this invention can initially comprise a tubular part 37 as illustrated in FIG. 4 having an internally smooth peripheral surface 38 that is approximately the same diameter as an annular shoulder 39 on the internally threaded member 23A and is stepped below the external peripheral surface 33A thereof as illustrated in FIG. 4. However, by stretching the member 37 onto the internally threaded member 23A so that the internal peripheral surface 38 of the tubular member 37 goes over the external peripheral surface 33A of the internally threaded member 23A, a trailing portion 40 of the tubular member 37 will snap fit into the recess 41 defined by the annular shoulder 39 in the manner illustrated in FIG. 5 so as to secure the annular member 34 of this invention in its final position to form the internally threaded member 23A for the hose assembly 20A and for the purposes previously set forth.

However, it is believed that the annular member of SANTOPRENE material or even of any other desired plastic material could be injection molded onto the internally threaded member 23A to secure the same together for the same purpose as snap-fitting the member 34 in place.

Figure 7:
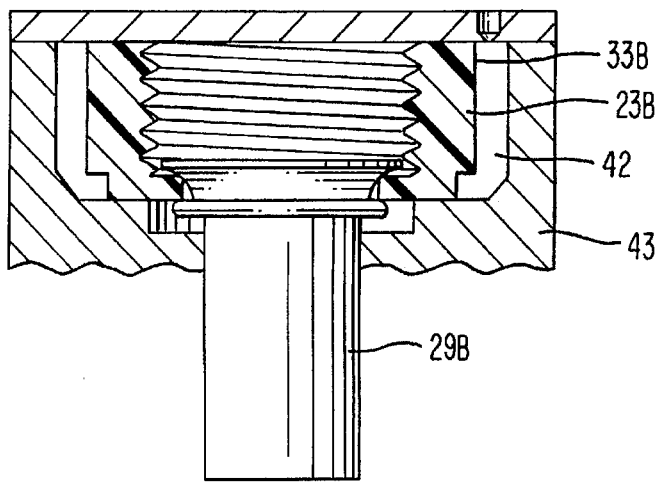
FIG. 7 is a cross-sectional view illustrating how another embodiment of the internally threaded member of this invention is formed by molding the annular plastic outer member onto the internally threaded member, FIG. 7 illustrating the mold device disposed around the internally threaded member and before the mold material is injected therein.
Figure 8:
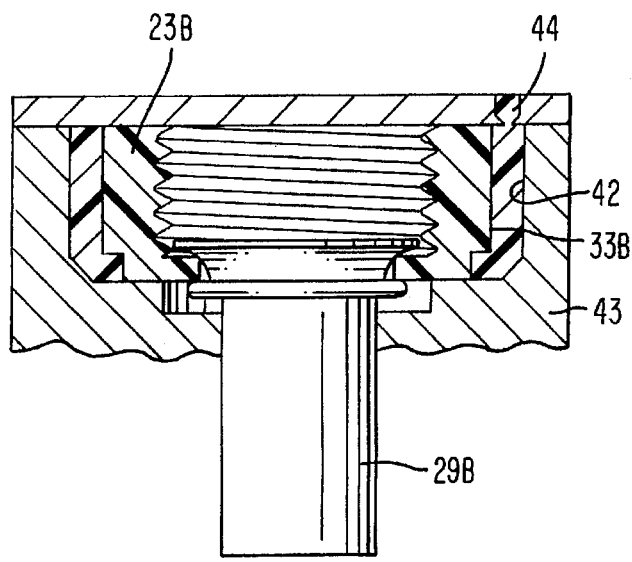
FIG. 8 is a view similar to FIG. 7 and illustrates the mold arrangement after the mold material has been injected therein.
Figure 9:
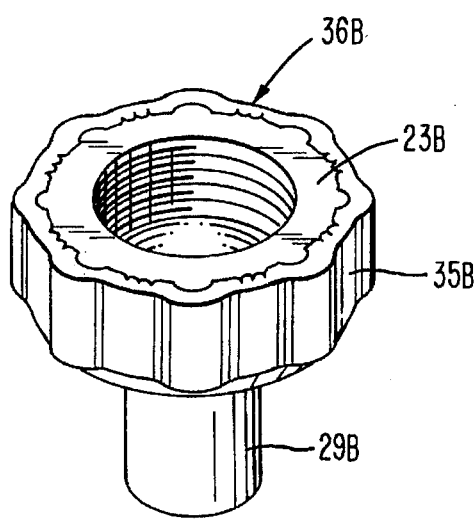
FIG. 9 is a reduced perspective view illustrating the finished internally threaded assembly formed by the method illustrated in FIGS. 7 and 8.

For example, reference is now made to FIGS. 7, 8 and 9 wherein another internally threaded assembly of this invention is generally indicated by the reference numeral 36B and parts thereof similar to the parts of the internally threaded assembly 36 of FIGS. 3–6, are indicated by like reference numerals followed by the reference letter "B".

As illustrated in FIGS. 7, the internally threaded member 23B together with or without the coupling member 29B is disposed in a chamber or cavity 42 of a molding apparatus 43, the chamber 42 of the molding apparatus 43 defining an annular chamber that corresponds in configuration to the annular member 34 of FIGS. 3, 5 and 6.

As illustrated in FIG. 8, suitable polymeric material 44 is injection molded into the cavity 42 to be molded against the external peripheral surface 33B of the internally threaded member 23A so as to subsequently harden or vulcanize and form the internally threaded assembly 36B illustrated in FIG. 9 whereby the external peripheral surface 35B is adapted to be finger engaged for coupling and uncoupling to an externally threaded part of a liquid dispensing spigot or the like for the reasons previously set forth and should the plastic material 44 comprise a SANTOPRENE material, the material 44 will have the characteristics of being a soft surface and non-slippery when wet or dry for the reasons previously set forth.

Therefore, it can be seen that this invention not only provides a new hose assembly and a new internally threaded member for such a hose assembly, but also this invention provides a new method of making such a hose assembly and a new method of making an internally threaded member.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a hose assembly comprising a flexible hose having opposite ends, an internally threaded member mounted on one of said opposite ends in a manner to swivel thereon to permit said internally threaded member to be finger coupled to an externally threaded part of a liquid dispensing spigot, said internally threaded member having an outer peripheral surface, and an annular member disposed around said internally threaded member in a manner to engage said outer peripheral surface thereof and having an external peripheral surface to be finger engaged for turning said internally threaded member in unison therewith relative to said hose, the improvement wherein said annular member comprises a SANTOPRENE material and includes an inwardly extending edge portion that engages a recessed shoulder of said internally threaded member.

2. A hose assembly as set forth in claim 1 wherein said SANTOPRENE material is a soft surfaced material that is non-slippery when dry or wet.

3. A hose assembly as set forth in claim 1 wherein said SANTOPRENE material has been molded onto said internally threaded member.

4. A hose assembly as set forth in claim 3 wherein said internally threaded member comprises thermoplastic material.

5. An internally threaded member as set forth in claim 3 wherein said internally threaded member comprises thermoplastic material.

6. An internally threaded member as set forth in claim 1 wherein said SANTOPRENE material has been molded onto said internally threaded member.

7. In a hose assembly comprising a flexible hose having opposite ends, an internally threaded member mounted on one of said opposite ends in a manner to swivel thereon to permit said internally threaded member to be finger coupled to an externally threaded part of a liquid dispensing spigot, said internally threaded member having an outer peripheral surface, and an annular plastic member disposed around said internally threaded member in a manner to engage said outer peripheral surface thereof and having an external peripheral surface to be finger engaged for turning said internally threaded member in unison therewith relative to said hose, the improvement wherein said annular plastic member had been molded onto said internally threaded member and includes an inwardly extending edge portion that engages a recessed shoulder of said internally threaded member.

8. A hose assembly as set forth in claim 7 wherein said plastic material is a soft surfaced material that is non-slippery when dry or wet.

9. A hose assembly as set forth in claim 7 wherein said internally threaded member comprises thermoplastic material.

10. In an internally threaded member for a hose assembly comprising a flexible hose having opposite ends whereby said internally threaded member is adapted to be mounted on one of said opposite ends in a manner to swivel thereon to permit said internally threaded member to be finger coupled to an externally threaded part of a liquid dispensing spigot, said internally threaded member having an outer peripheral surface, and an annular member disposed around said internally threaded member in a manner to engage said outer peripheral surface thereof and having an external peripheral surface to be finger engaged for turning said internally threaded member in unison therewith relative to said hose, the improvement wherein said annular member comprises a SANTOPRENE material and includes an inwardly extending edge portion that engages a recessed shoulder of said internally threaded member.

11. An internally threaded member as set forth in claim 10 wherein said SANTOPRENE material is a soft surfaced material that is non-slippery when dry or wet.

12. In an internally threaded member for a hose assembly comprising a flexible hose having opposite ends, an internally threaded member mounted on one of said opposite ends in a manner to swivel thereon to permit said internally threaded member to be finger coupled to an externally threaded part of a liquid dispensing spigot, said internally threaded member having an outer peripheral surface, and an annular plastic member disposed around said internally threaded member in a manner to engage said outer peripheral surface thereof and having an external peripheral surface to be finger engaged for turning said internally threaded member in unison therewith relative to said hose, the improvement wherein said annular plastic member had been molded onto said internally threaded member and includes an inwardly extending edge portion that engages a recessed shoulder of said internally threaded member.

13. An internally threaded member for a hose assembly as set forth in claim 12 wherein said plastic material is a soft surfaced material that is non-slippery when dry or wet.

14. An internal threaded member for a hose assembly as set forth in claim 12 wherein said internally threaded member comprises thermoplastic material.

15. In a method of making a hose assembly comprising a flexible hose having opposite ends, an internally threaded member mounted on one of said opposite ends in a manner to swivel thereon to permit said internally threaded member to be finger coupled to an externally threaded part of a liquid dispensing spigot, said internally threaded member having an outer peripheral surface, and an annular member disposed around said internally threaded member in a manner to engage said outer peripheral surface thereof and having an external peripheral surface to be finger engaged for turning said internally threaded member in unison therewith relative to said hose, the improvement comprising the step of forming said annular member from a SANTOPRENE material to have an inwardly extending edge portion that engages a recessed shoulder of said internally threaded member.

16. A method of making a hose assembly as set forth in claim 15 wherein said SANTOPRENE material is a soft surfaced material that is non-slippery when dry or wet.

17. A method of making a hose assembly as set forth in claim 15 and comprising the step of molding said SANTOPRENE material onto said internally threaded member.

18. In a method of making a hose assembly comprising a flexible hose having opposite ends, an internally threaded member mounted on one of said opposite ends in a manner to swivel thereon to permit said internally threaded member to be finger coupled to an externally threaded part of a liquid dispensing spigot, said internally threaded member having an outer peripheral surface, and an annular plastic member disposed around said internally threaded member in a manner to engage said outer peripheral surface thereof and having an external peripheral surface to be finger engaged for turning said internally threaded member in unison therewith relative to said hose, the improvement comprising the step of molding said annular plastic member onto said internally threaded member to have an inwardly extending edge portion that engages a recessed shoulder of said internally threaded member.

19. In a method of making an internally threaded member for a hose assembly comprising a flexible hose having opposite ends whereby said internally threaded member is adapted to be mounted on one of said opposite ends in a manner to swivel thereon to permit said internally threaded member to be finger coupled to an externally threaded part of a liquid dispensing spigot, said internally threaded member having an outer peripheral surface, and an annular member disposed around said internally threaded member in a manner to engage said outer peripheral surface thereof and having an external peripheral surface to be finger engaged for turning said internally threaded member in unison therewith relative to said hose, the improvement comprising the step of forming said annular member from a SANTOPRENE material to have an inwardly extending edge portion that engages a recessed shoulder of said internally threaded member.

20. In a method of making an internally threaded member for a hose assembly comprising a flexible hose having opposite ends whereby said internally threaded member is adapted to be mounted on one of said opposite ends in a manner to swivel thereon to permit said internally threaded member to be finger coupled to an externally threaded part of a liquid dispensing spigot, said internally threaded member having an outer peripheral surface, and an annular member disposed around said internally threaded member in a manner to engage said outer peripheral surface thereof and having an external peripheral surface to be finger engaged for turning said internally threaded member in unison therewith relative to said hose, the improvement comprising the step of molding said annular plastic member onto said internally threaded member to have an inwardly extending edge portion that engages a recessed shoulder of said internally threaded member.

21. In a method of making a hose assembly comprising a flexible hose having opposite ends, an internally threaded member mounted on one of said opposite ends in a manner to swivel thereon to permit said internally threaded member to be finger coupled to an externally threaded part of a liquid dispensing spigot, said internally threaded member having an outer peripheral surface, and an annular plastic member disposed around said internally threaded member in a manner to engage said outer peripheral surface thereof and having an external peripheral surface to be finger engaged for turning said internally threaded member in unison therewith relative to said hose, the improvement comprising the steps of forming said annular plastic member as a tubular part having a smooth internal peripheral surface with a diameter that is approximately the same as the diameter of a recessed annular shoulder on said outer peripheral surface of said internally threaded member, and then stretching said tubular part over said internally threaded member such that a trailing portion of said tubular part will snap fit into said recessed annular shoulder of said internally threaded member.

* * * * *